Patented June 14, 1949

2,473,060

UNITED STATES PATENT OFFICE 2,473,060

BEARING ALLOYS

Harold Y. Hunsicker, Cleveland, and Louis Walter Kempf, Shaker Heights, Ohio, assignors to Aluminum Company of America, Pittsburgh, Pa., a corporation of Pennsylvania No Drawing. Application November 14, 1945, Serial No. 628,660

6 Claims. (Cl. 75—140)

This invention relates to a metallic composition to be used as a bearing and anti-friction material and the bearings made from this composition. The object of the invention is to improve the present aluminum alloy bearings now in use in the trade and to provide an aluminum alloy bearing characterized by superior bearing and wear-resisting properties and ability to carry a relatively high load under conditions of constant loading or under conditions of repeated impact loading. A further object of this invention is to provide a bearing material which has good resistance at normal or elevated temperatures to the corrosive agents present in lubricating oils or in the decomposition products of such oils, which are harmful to bearings. It is another object of this invention to provide such a bearing material which may, in addition, be readily machined and finished to a very smooth surface which will form a maximum of true bearing area and promote uniformity of bearing pressure distribution.

The alloyed bearing material which is the subject of this invention is composed principally of aluminum. That metal is available in either primary form or in the form of secondary or scrap metal. Either form may be used in this new bearing material, but when secondary or scrap metal is used, impurities such as iron, manganese, nickel, magnesium, zinc, titanium and chromium should be limited to a permissible amount of less than about 2 per cent by weight of total material, and no single such impurity should preferably be permitted in amounts in excess of about 1 per cent. Apart from aluminum, the new bearing alloy consists of 5 to 25 per cent by weight of tin, 5 to 12 per cent by weight of silicon and 2 to 10 per cent by weight of copper. Preferably, and for best results, the tin should be present in amount in excess of the amount of silicon. We have found that copper stabilizes the silicon particles which are distributed through the aluminum matrix of this alloy and does so without impairing or disturbing the important and improved anti-friction and abrasion resisting properties of the bearing materials. Copper, in the concentrations described, also imparts a beneficial improvement in the strength of the alloy at ordinary and elevated temperatures, particularly after a suitable heat treatment. For bearings in which a certain degree of plasticity is essential, we prefer to use copper in the range 2 to 5 per cent by weight. For certain other types of bearings in which plasticity is not an essential requirement, it is desirable that the alloy contain more than 5 per cent but not more than 10 per cent by weight of copper. If desired, a portion of the tin may be replaced by a metal selected from the group consisting of a lead and cadmium, which are other low melting constituents often used in bearing alloys. However, if equivalency is to be maintained, such replacement should not take place to an extent which would be greater than 30 per cent of the total amount of tin, lead and cadmium in the alloy or greater than 2 per cent by weight of the total alloy, whichever amount is the lesser.

For bearings which are subjected to severe alternating, rotating or pulsating loads we prefer to use the alloy as described containing not more than about 15 per cent by weight of the low-melting constituent, which is composed principally of tin. For bearings which are subjected to an essentially constant and unidirectional load or relatively light alternating, rotating or pulsating loads, a higher concentration of the low-melting constituent, about 15 to 25 per cent, may be employed in the alloy providing the advantage of further improvement in the anti-friction qualities.

The aluminum alloy just described may be used as a bearing material in either cast or wrought form, but when the alloy is to be worked into the form of sheet, it is desirable that the alloying elements be present in amounts which lie in the lower portions of the ranges of those elements above set forth.

By proper heat treatments, improved bearing characteristics as well as dimensional stability may be imparted to bearings made of our novel material. Where stabilization of dimensions is the reason for the heat treatment, a heating for 8 to 12 hours at temperatures of about 350 to 440 degrees F. will prove satisfactory. Such heat treatment will also increase strength and hardness to some extent. Where it is desirable to improve machining characteristics, bearing qualities and wear resistance of the material, we prefer to use a heat treatment which comprises heating the bearing material for 8 to 12 hours at temperatures of 850 to 950 degrees F., then cooling the thus heated material as by quenching in water, air or other coolant, and thereafter reheating the material to 350 to 450 degrees F. for a period of 8 to 12 hours. The times and temperatures given are merely exemplary of heat treatment methods which may be used to improve the bearings and are the heat treatments which we have found to be best suited to this purpose. Other heating steps for other times and at temperatures which do not exceed temperatures at which undue melting of the bearing material would be caused may, if desired, be used.

Tests of bearings made of the alloys above described have demonstrated that said bearings are superior to those aluminum alloy bearings in use prior to this invention.

We claim:

1. A bearing composed of an alloy consisting of 5 to 25 per cent by weight of tin, 5 to 12 per cent by weight of silicon and 2 to 10 per cent by weight of copper, the balance being principally aluminum with impurities not exceeding 2 per cent by weight of the alloy.

2. A bearing composed of an alloy consisting of 5 to 25 per cent by weight of tin, 5 to 12 per cent by weight of silicon and 2 to 10 per cent by weight of copper, the balance being principally aluminum with impurities not exceeding 2 per cent by weight of the alloy, the amount of tin being in excess of the amount of silicon.

3. An anti-friction bearing alloy consisting of 5 to 25 per cent by weight of tin, 5 to 12 per cent by weight of silicon and 2 to 10 per cent by weight of copper, the balance being principally aluminum with impurities not exceeding 2 per cent by weight of the alloy.

4. An anti-friction bearing alloy consisting of 5 to 25 per cent by weight of tin, 5 to 12 per cent by weight of silicon and 2 to 10 per cent by weight of copper, the balance being principally aluminum with impurities not exceeding 2 per cent by weight of the alloy, the amount of tin being in excess of the amount of silicon.

5. A bearing composed of an alloy consisting of 5 to 25 per cent by weight of tin, 5 to 12 per cent by weight of silicon and 2 to 5 per cent by weight of copper, the balance being principally aluminum with impurities not exceeding 2 per cent by weight of the alloy, the amount of tin being in excess of the amount of silicon.

6. An anti-friction bearing alloy consisting of 5 to 25 per cent by weight of tin, 5 to 12 per cent by weight of silicon and 2 to 5 per cent by weight of copper, the balance being principally aluminum with impurities not exceeding 2 per cent by weight of the alloy.

HAROLD Y. HUNSICKER.
LOUIS WALTER KEMPF.

REFERENCES CITED

The following references are of record in the file of this patent:

UNITED STATES PATENTS

| Number | Name | Date |
|---|---|---|
| 1,572,327 | Johnston | Feb. 9, 1926 |

FOREIGN PATENTS

| Number | Country | Date |
|---|---|---|
| 456,343 | Germany | Feb. 18, 1928 |

OTHER REFERENCES

Practical Metallurgy, by Sachs and Van Horn, 1940, page 271.